US006695540B1

(12) United States Patent
Taquino (10) Patent No.: US 6,695,540 B1
(45) Date of Patent: Feb. 24, 2004

(54) VORTEX INDUCED VIBRATION SUPPRESSION DEVICE AND METHOD

(76) Inventor: Weldon Taquino, 542 Bayview Rd., Cypremort Point, LA (US) 70538

( * ) Notice: Subject to any disclaimer, the term of this patent is extended or adjusted under 35 U.S.C. 154(b) by 0 days.

(21) Appl. No.: 10/292,894

(22) Filed: Nov. 12, 2002

Related U.S. Application Data (63) Continuation of application No. 09/712,759, filed on Nov. 14, 2000, now abandoned.

(51) Int. Cl.[7] .................................................. F15D 1/10
(52) U.S. Cl. ..................... 405/216; 405/211; 114/243
(58) Field of Search .......................... 405/211, 211.1, 405/212, 216; 114/243

(56) References Cited

U.S. PATENT DOCUMENTS

| 3,410,096 A | 11/1968 | Schuh ............................. 61/46 |
| 3,572,041 A | 3/1971 | Graaf .......................... 61/46.5 |
| 4,398,487 A | 8/1983 | Ortloff et al. ................ 114/243 |
| 4,439,070 A | 3/1984 | Dimmick ...................... 405/216 |
| 4,474,129 A | 10/1984 | Watkins et al. ............. 114/243 |
| 4,657,116 A | 4/1987 | Gardner et al. ............. 187/1 R |
| 5,410,979 A | 5/1995 | Allen et al. .................. 114/243 |
| 5,421,413 A | 6/1995 | Allen et al. .................. 166/335 |
| 5,460,463 A | 10/1995 | Smith .......................... 405/212 |
| 5,722,340 A | 3/1998 | Sweetman ................... 114/243 |
| 5,738,034 A | 4/1998 | Wolff et al. .................. 114/243 |
| 6,019,549 A | 2/2000 | Blair et al. .................. 405/216 |
| 6,048,136 A | 4/2000 | Denison et al. ............. 405/211 |
| 6,062,769 A | 5/2000 | Cuningham .............. 405/195.1 |
| 6,067,922 A | 5/2000 | Denison et al. ............. 114/243 |

*Primary Examiner*—Frederick L. Lagman
(74) *Attorney, Agent, or Firm*—Garvey, Smith, Nehrbass & Doody, L.L.C.; Charles C. Garvey, Jr.

(57) ABSTRACT

A vortex induced vibration suppressor and method is disclosed. The apparatus includes a body that is a flexible member of a polymeric (eg. polyurethane) construction. A plurality of helical vanes on the body extend longitudinally along and helically about the body. A longitudinal slot enables the body to be spread apart for placing the body upon a riser, pipe or pipeline. Adhesive and/or bolted connections optionally enable the body to be secured to the pipe, pipeline or riser.

10 Claims, 7 Drawing Sheets

VORTEX INDUCED VIBRATION SUPPRESSION DEVICE AND METHOD

CROSS-REFERENCE TO RELATED APPLICATIONS

This is a continuation of U.S. Ser. No. 09/712,759, filed Nov. 14, 2000, now abandoned.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to vortex induced vibration suppression and more particularly to an improved apparatus for suppressing vortex induced vibrations in vertical risers of oil and gas well drilling platforms and production platforms. Even more particularly, the present invention relates to an improved vortex induced vibration suppression apparatus, also known as a strake, wherein the improved apparatus includes an elongated body of flexible polymeric material such as polyurethane, the body having a wall surrounding a continuous open-ended bore, a plurality of helical vanes provided on the body, (preferably integral therewith) that extend along the length of the body and a longitudinal slot that extends through the wall enabling the body to be separated such as during placement upon a pipe, riser or pipeline.

2. General Background of the Invention

Vortex induced vibration suppressors are devices that have been used commercially to prevent vortex induced vibration. It has been stated that risers such as those associated with TLP type platforms suffer from vortex induced vibration or "VIV". Floatable and tension leg platform (TLP) risers suffer from vibration induced vortex caused by ocean currents, for example. VIV can be an acute problem in deep water drilling operations. As the current flows around an unsupported pipe such as a pipeline riser, it creates vortices on the leeward side of the pipe. Vortices produce minute pressure fluctuations that create vibrations on the leeward side of the pipe. When these vortices break away from the pipe, they set up vibrations which will dynamically excite the riser and cause the pipe to fail prematurely. Strong currents increase the amount of vortex induced vibration (VIV).

Presently, there are a number of commercially available vortex induced vibration suppressors. One such product is available from Mark Tool Company of Lafayette, La. Another commercially available vortex induced vibration suppressor is available from CRP Marine Products of England. Another commercially available vortex induced vibration suppressor or "strake" system is being commercialized by Dunlaw of Aberdine, Scotland. Another device that is commercially available and that suppresses vortex induced vibration is sold under the mark Uraduct® VIV.

One of the problems of placing a vortex induced vibration suppressor on an oilfield riser pipe such as the riser associated with a deep water oil and gas well drilling or production platform is the problem of installing or placing the strake. This problem can be solved by using an underwater diver or divers. However, such a procedure is dangerous and very costly. Some VIV devices have multiple parts that limit overall structural strength.

BRIEF SUMMARY OF THE INVENTION

The present invention provides an improved method and apparatus for solving the problem of vortex induced vibration by providing a suppression apparatus of improved construction that features an elongated body of flexible polymeric material (for example polyurethane), the body having a wall surrounding a continuous, open-ended bore.

A plurality of helical vanes are provided on the body, extending along the length thereof.

A longitudinal slot extends through the wall, enabling the body to be separated to afford access to the bore (such as during placement on a pipe or riser). In another embodiment, the apparatus can be cast in place on a pipe joint or cast as a one piece strake that is slipped over a pipe and then glued, eliminating the slot and bolted connection.

In the preferred embodiment, the entire elongated body and vanes are of a integrally formed, preferably cast or molded polymeric material (for example, polyurethane). This construction enables the entire elongated body to be flexed as portions of the body are separated apart at the slot.

In the preferred embodiment, the slot extends along one of the vanes, separating the vane into first and second vane portions, each having a surface that abuts a corresponding surface of the other vane portion upon assembly.

The slot is preferably a helically shaped slot that tracks the path of the vane.

A removable connection can hold the body together at the slot. In the preferred embodiment, this removable connection is in the nature of a bolted connection or connections that bolt first and second vane portions together.

This removable connection is preferably comprised of a plurality of regularly spaced apart, bolted connections.

In the preferred embodiment, the slot separates one of the vanes into first and second longitudinally extending vane sections, each having a flat mating surface (or offset for aiding alignment), wherein the flat mating surfaces are engaged, the bolted connections can be perfected to hold them together.

In another embodiment, the present invention provides an improved vortex induced vibration suppression apparatus that features the elongated body and helical vanes with a longitudinal slot that extends through the wall at a vane for enabling the body to be separated to afford access to the bore.

In an alternate embodiment, a spacer is removably attachable to the body, the spacer including a rounded outer surface that enable the spacer and body to be rolled such as during handling upon the deck of a ship or barge. The spacer provides an elongated bore that is shaped to fit the body and its helical vanes.

The present invention provides an improved method of installing a riser having one or more vortex induced vibration suppression devices thereon. The method includes first making up the riser section on a pipeline lay barge that provides a stinger. The vortex induced vibration device or devices is attached to the pipeline on the lay barge. In this fashion, the riser and attached vortex induced vibration suppression devices can be lowered to the seabed by first passing the riser and attached vortex induced vibration suppression devices over the stinger part of the barge. With the present invention, the improved construction of the vortex induced vibration suppression device enables the apparatus to be lowered over a stinger of a lay barge to the ocean floor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1–11 show the preferred embodiment of the apparatus of the present invention, designated generally by the numeral 10.

Figures 1, 2:
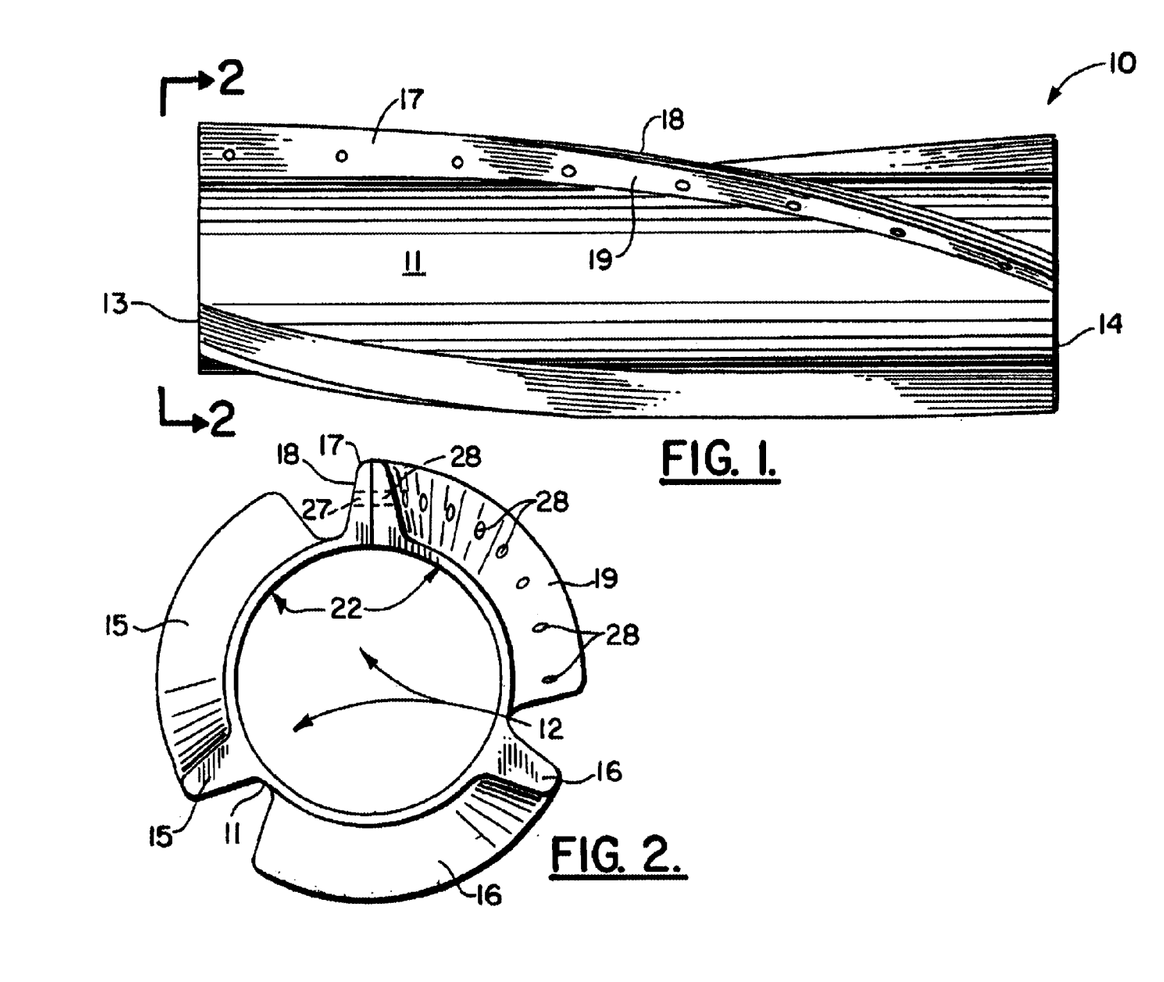
FIG. 1 is a side view of the preferred embodiment of the apparatus of the present invention.
FIG. 2 is an end view of the preferred embodiment of the apparatus of the present invention taken along lines 2—2 of FIG. 1.

Vortex induced vibration suppression device 10 includes body 11 having a central longitudinal open ended bore 12 and end portions 13, 14.

Body 11 is preferably a one piece, molded or cast flexible body that is preferably of a polymeric material such as polyurethane. A plurality of helical vanes 15, 16, 17 extend from the wall 30 of body 11 and are preferably integral therewith. A longitudinally extending slot can be optionally formed by mating surfaces 20, 21 of vane sections 18, 19 as shown in FIGS. 1–4. Otherwise, body 11 does not have a slot but is a one piece integral member that can be installed by slipping it over an end of a joint of pipe. It can also be case in place on a joint of pipe.

Figure 3:
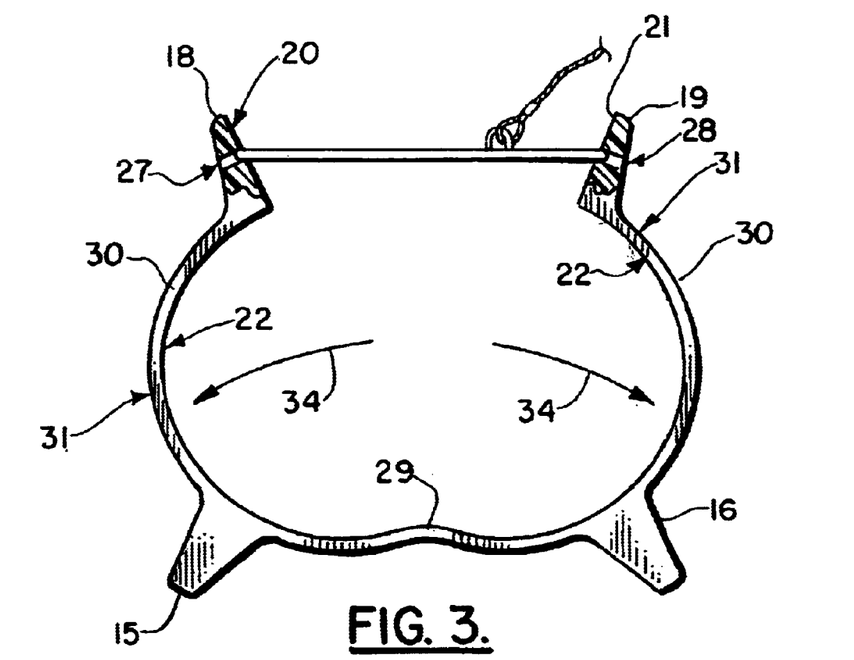
FIG. 3 is an end view of the preferred embodiment of the apparatus of the present invention and showing part of the method of the present invention wherein the vortex induced vibration suppression apparatus is being separated at its slot for installation.
Figure 4:
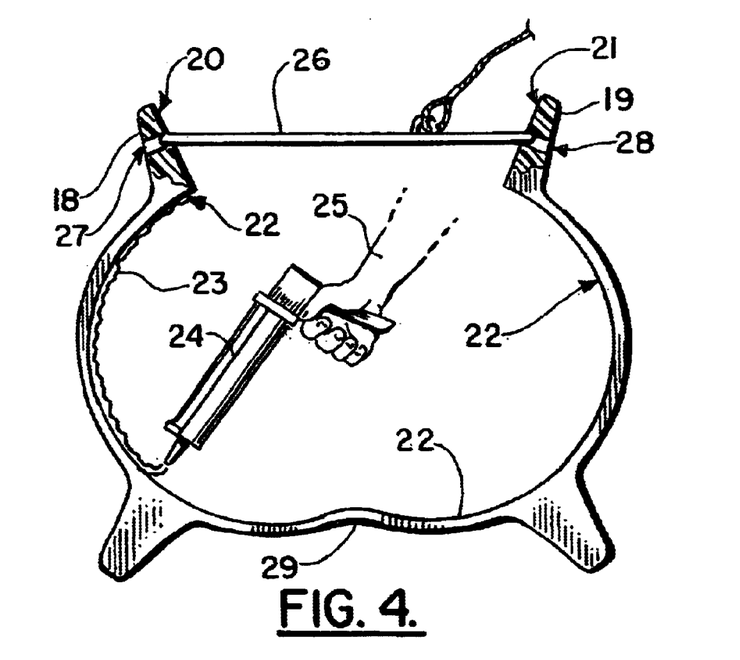
FIG. 4 is another end view illustrating the preferred embodiment of the apparatus of the present invention and showing the optional method step of applying an adhesive to the inside wall surface thereof and is part of the method of the present invention.
Figure 5:
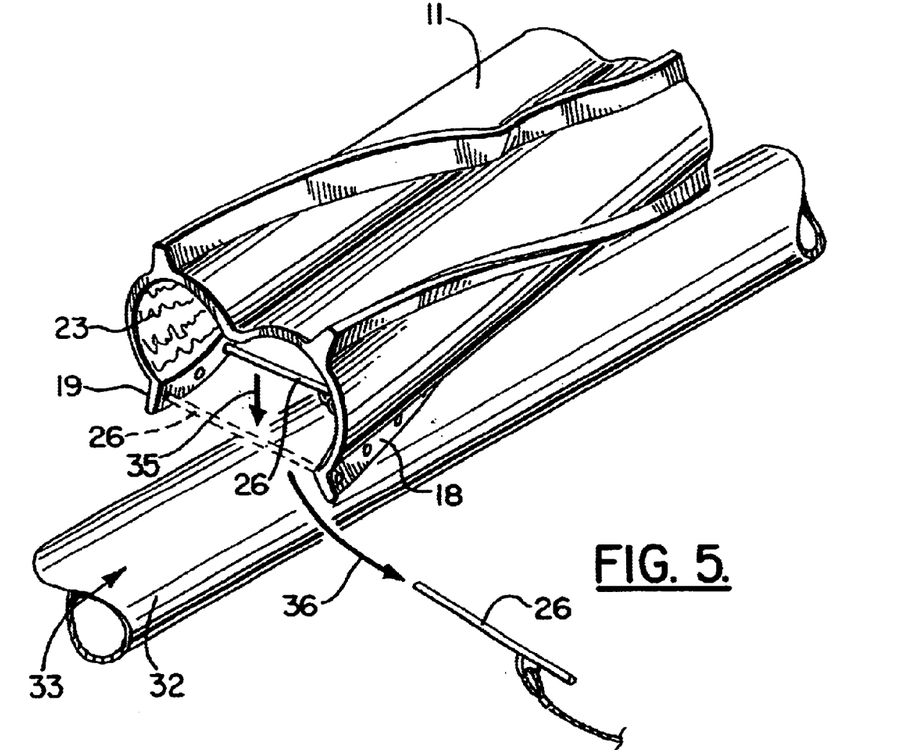
FIG. 5 is a perspective view of the preferred embodiment of the apparatus of the present invention and illustrating one of the method steps of the present invention, namely the application of the vortex induced vibration suppression device to a riser.

A hinge area 29 is provided generally opposite vane sections 18, 19 and the respective mating surfaces 20, 21. A user can spread apart the vane sections 18, 19 as shown by arrows 34 in FIG. 3 for enabling a technician 25 to apply an adhesive 23 using a desired tool or implement such as dispenser 24 to the inside surface 22 of body 11. During this procedure, a spreader bar 26 can be used to hold the vane sections 18, 19 apart as shown in FIGS. 3–5.

The vane section 18 provides a plurality of longitudinally extending, spaced apart openings 27. The openings 27 align with a corresponding plurality of longitudinally extending, spaced apart openings 28 through vane section 19. After an adhesive is applied to inside surface 22 of wall 30 of body 11, the body 11 can be placed upon a pipeline riser section 32 as indicated schematically by arrow 35 in FIG. 5. Arrow 36 in FIG. 5 schematically illustrates the removal of spreader bars 26 once the body 11 is placed upon riser section 32.

Figure 6:
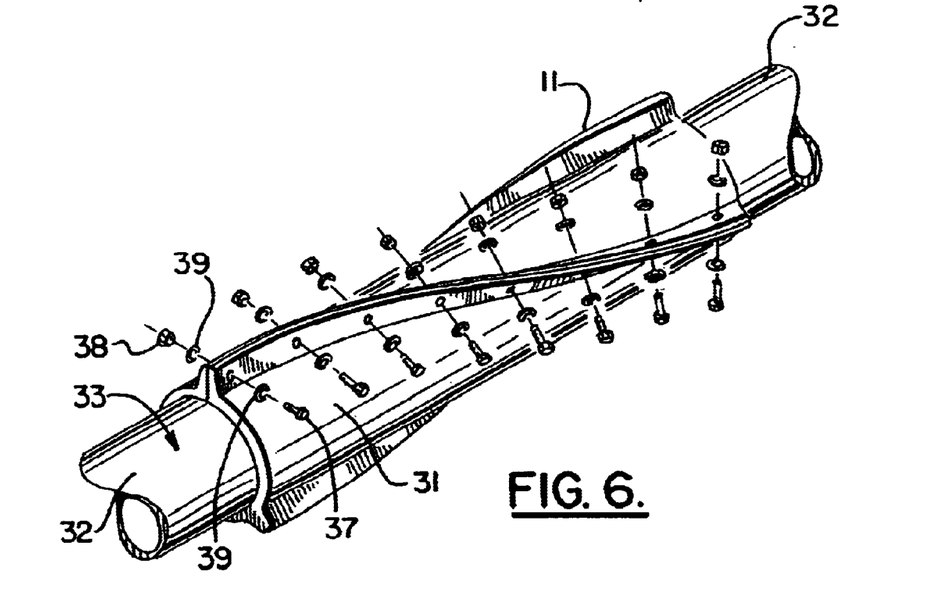
FIG. 6 is a perspective view showing the preferred embodiment of the apparatus of the present invention and illustrating part of the method of the present invention, namely the application of fasteners such as bolted connections to the apparatus after placement upon a riser.
Figure 7A:
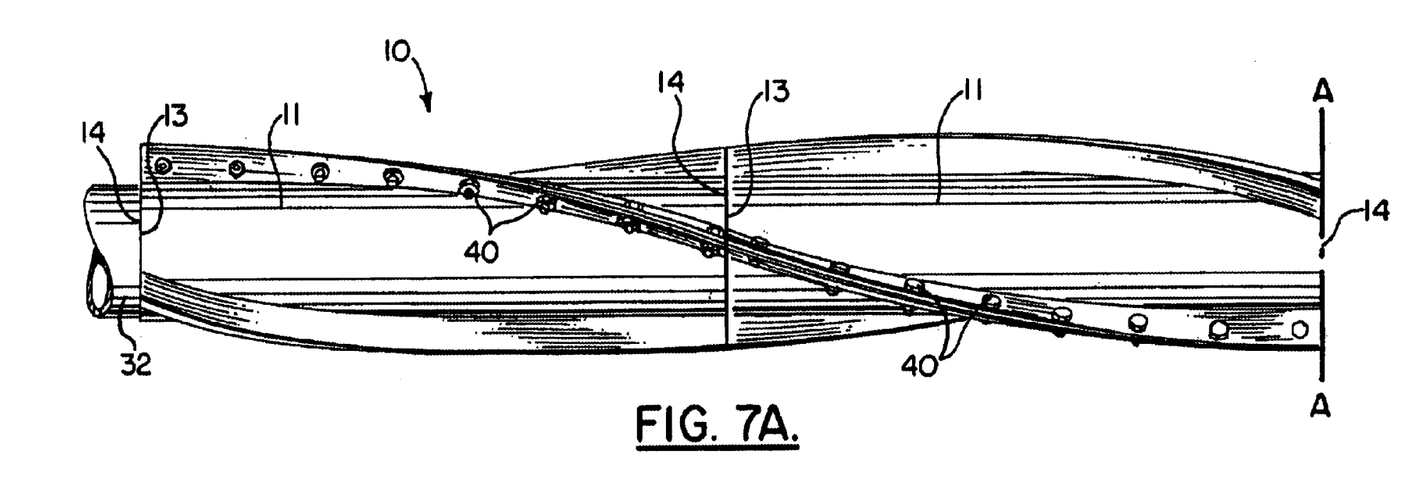
FIGS. 7A–7B are side views of the preferred embodiment of the apparatus of the present invention showing the device after placement upon a riser.
Figure 7B:
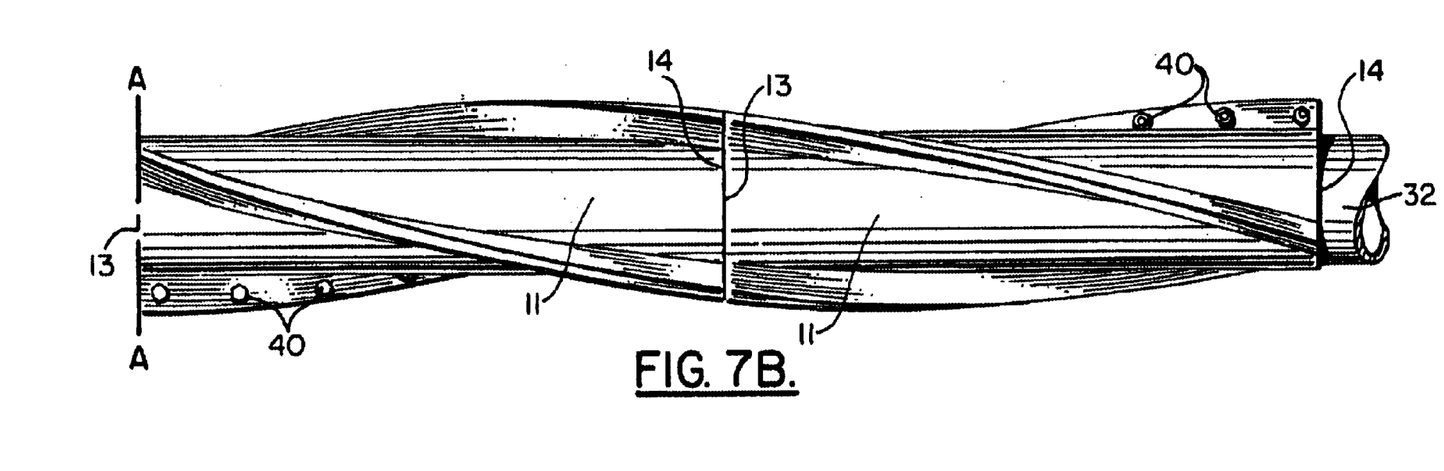

When properly assembled upon a pipeline riser section 32 as shown in FIG. 6, the wall 30 outer surface 31 provides a smooth contour that is substantially similar in curvature to the outside surface of the pipeline riser section 32.

The adhesive 23 is designed to form a good bond between body 11 and the outside surface 33 of pipeline riser section 32. A plurality of bolted connections 40 can be used to bolt vane sections 18, 19 together to further secure each body. 11 to its pipeline riser section 32. In FIG. 6, each bolted connection 40 includes bolt 37, nut 38 and a plurality of washers 39 if desired.

Figure 8:
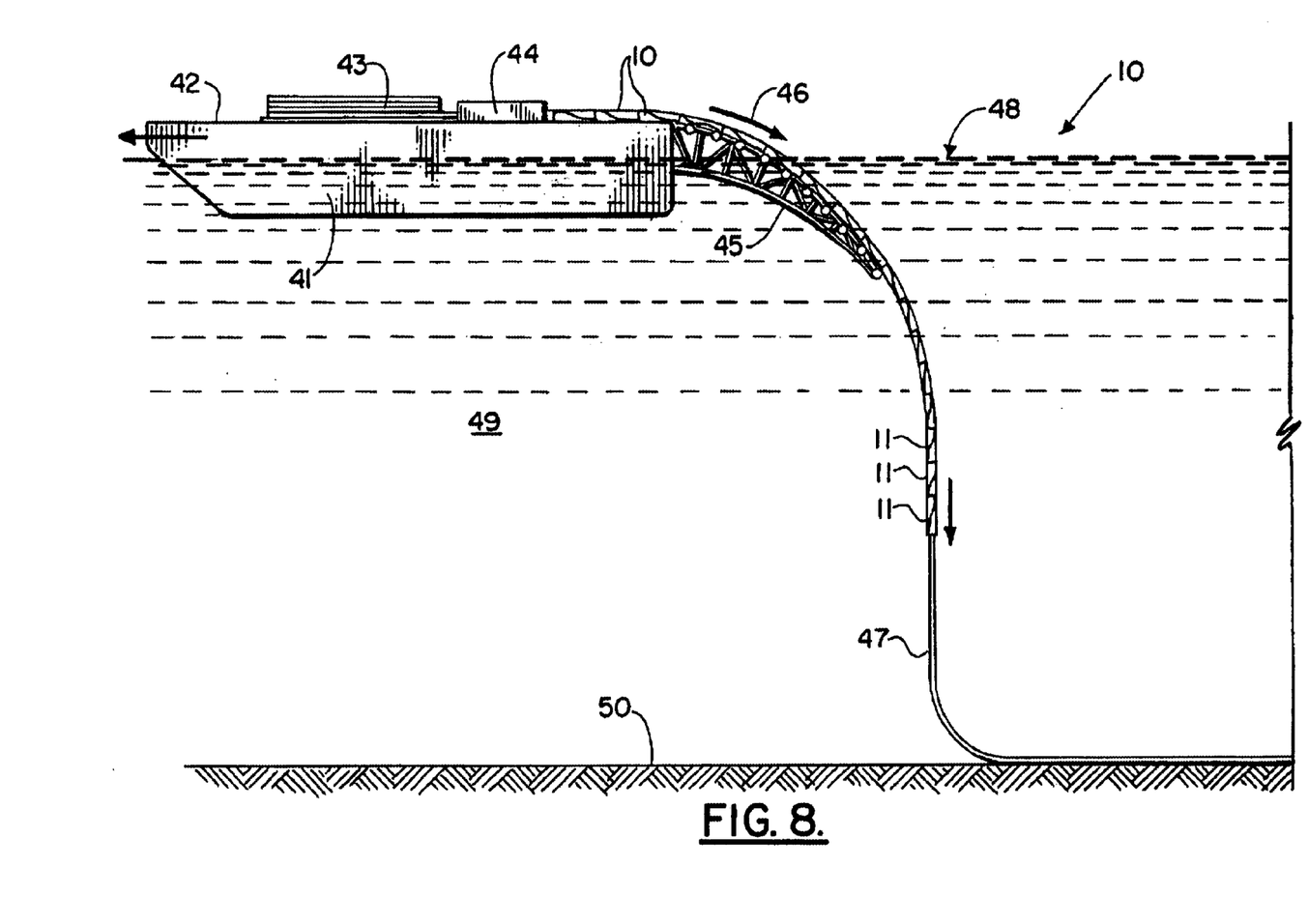
FIG. 8 is an elevation schematic view showing the method of the present invention, namely the step of lowering the riser and attached vortex induced vibration suppression devices from a pipeline lay barge to the ocean floor.

The method the present invention is further illustrated in FIGS. 8–9 and 10–11. In FIG. 8, a pipeline lay barge 41 is shown having a deck 42 upon which is stacked a plurality of pipe joints 43. The pipeline lay barge 41 also includes a welding area 44 that enables a plurality of the pipe joints 43 to be welded together end-to-end as known in the art. A stinger 45 is also provided with lay barge 41. Such a lay barge 41 and stinger 45 are well known in the art.

According to the method of the present invention, the vortex induced vibration suppression devices 10 of the present invention are assembled to the welded pipeline riser 47 before the riser 47 is lowered to the seabed 50 via stinger 45. In FIG. 8, the arrow 46 schematically illustrates a riser 47 that is fitted with a plurality of vortex induced vibration suppression devices 10. The combination of pipeline riser 47 and its vortex induced vibration suppression devices 10 or "strakes" are lowered over the stinger 45 as indicated by arrow 46. To further schematically illustrate the method of the present invention, the surrounding ocean 49 is also shown with water surface 48 and seabed 50.

Figure 9:
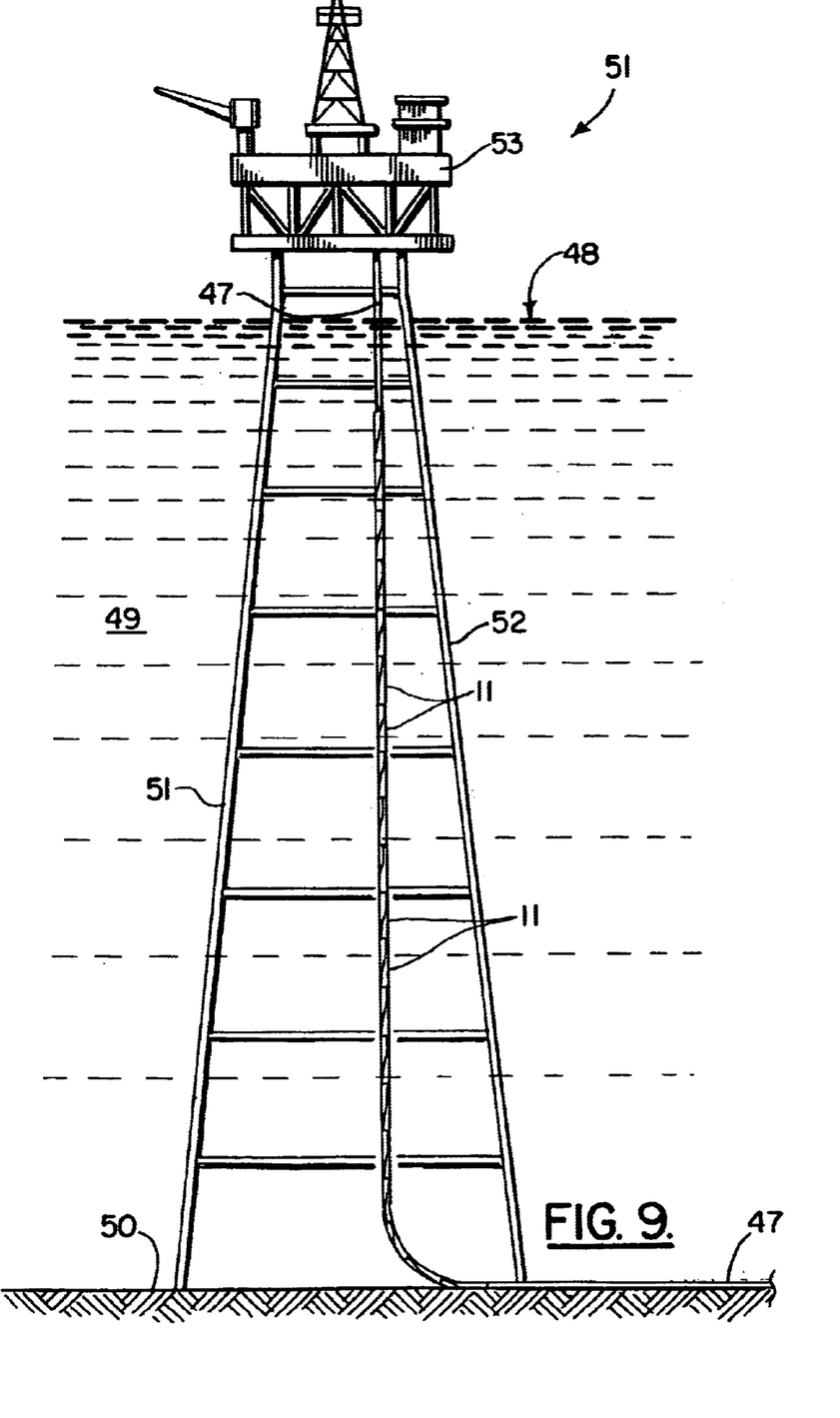
FIG. 9 is an elevation, schematic view of the preferred embodiment of the apparatus of the present invention illustrating the method of the present invention, showing several vortex induced vibration suppression devices mounted to a riser and showing a riser and connected devices positioned next to an offshore oil and gas well drilling/production platform.

In FIG. 9, an offshore platform 53 is shown. It should be understood that platform 53 can be an offshore oil and gas well drilling and/or production platform. Such a platform 53 is typically supported with support 52 that can be a semisubmersible, TLP or jacket type foundation or any other marine platform support known in the art. In FIG. 9, the numeral 51 schematically indicates the entire marine structure that includes support 52 and platform 53.

Figure 10:
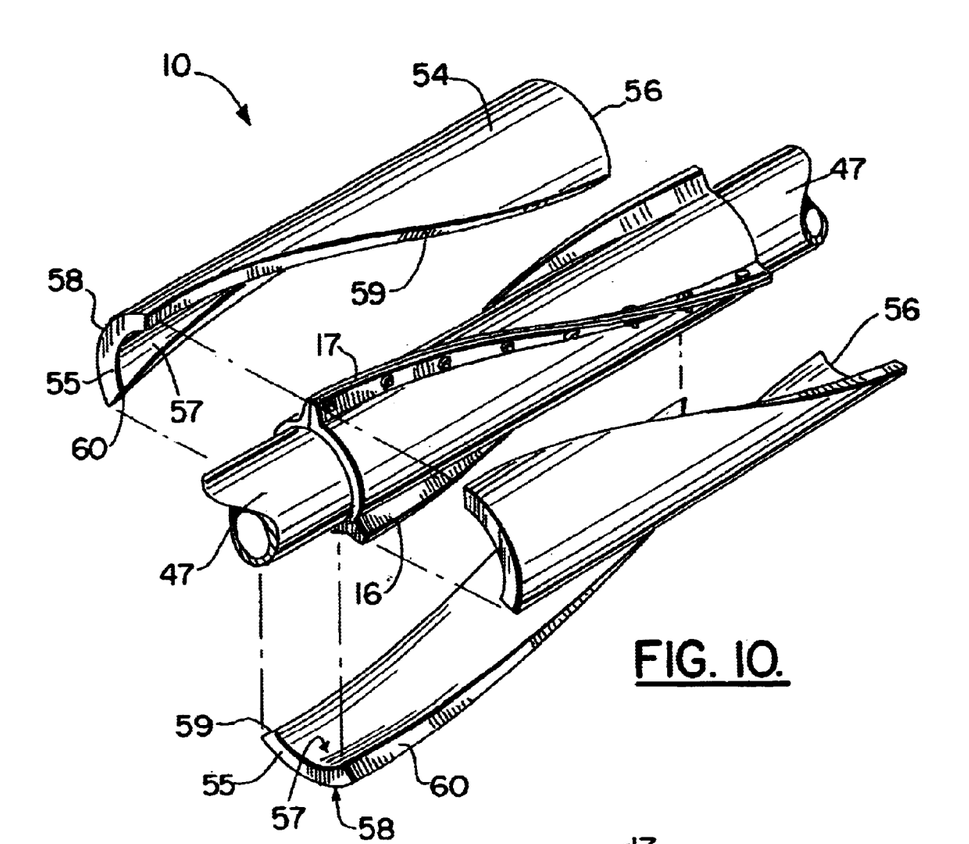
FIG. 10 is an exploded view of the preferred embodiment of the apparatus of the present invention.
Figure 11:
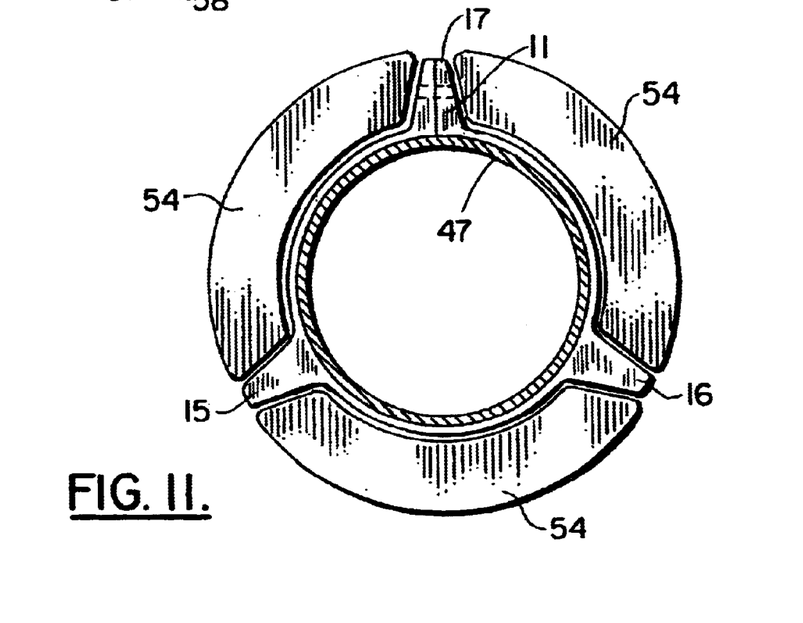
FIG. 11 is an end view of the preferred embodiment of the apparatus of the present invention.

In FIGS. 10 and 11, a plurality of spacers 54 are shown that are attachable to one of the bodies 11. As shown in FIGS. 10 and 11, three spacers 54 can be added to a single body 11 in order to transform it into a cylindrically shaped member that can be easily rolled for ease of transport and ease of installation. Each spacer 54 has end portions 55, 56. Each spacer has a concave surface 57 and a convex surface 58. The concave surfaces 57 are shaped to conform to the outside surface 31 of body 11 in between two adjacent vanes such as 15, 16 or 16, 17. Each spacer 54 provides side beveled edges 59, 60 that fit next to a vane 15, 16, 17 as shown in FIG. 10.

In FIG. 11, three spacers 54 are shown attached to a single body 11. A plurality of straps (not shown) can be used to encircle the combination of spacers 54 and body 11 to thereby secure the spacers 54 to the body 11 until they are to be removed. Typically, this removal can be accomplished just before the body 11 is to be transported to an end user or job site.

As an alternate embodiment, the polymer (eg. polyurethane) has a copper nickel particulate dust contained therein. This mixture of polymer and copper nickel particulate dust enhances antifouling capability of the strake.

PARTS LIST

The following is a list of suitable parts and materials for the various elements of the preferred embodiment of the present invention.

| 10 | vortex induced vibration suppression device |
|---|---|
| 11 | body |
| 12 | bore |
| 13 | end portion |
| 14 | end portion |
| 15 | helical vane |
| 16 | helical vane |
| 17 | helical vane |
| 18 | vane section |
| 19 | vane section |
| 20 | mating surface |
| 21 | mating surface |
| 22 | inside surface |
| 23 | adhesive |
| 24 | dispenser |
| 25 | technician |
| 26 | spreader bar |
| 27 | opening |
| 28 | opening |
| 29 | hinge area |
| 30 | wall |
| 31 | outer surface |
| 32 | pipeline riser section |
| 33 | outer surface |
| 34 | arrow |
| 35 | arrow |
| 36 | arrow |
| 37 | bolt |
| 38 | nut |
| 39 | washer |
| 40 | bolted connection |
| 41 | pipeline lay barge |
| 42 | deck |
| 43 | pipe joint |
| 44 | welding area |
| 45 | stinger |
| 46 | arrow |
| 47 | welded riser |
| 48 | water surface |
| 49 | ocean |
| 50 | seabed |
| 51 | marine structure |
| 52 | support |
| 53 | drilling/production platform |

-continued

| 54 | spacer |
|---|---|
| 55 | end portion |
| 56 | end portion |
| 57 | concave surface |
| 58 | convex surface |
| 59 | beveled edge |
| 60 | beveled edge |

The foregoing embodiments are presented by way of example only; the scope of the present invention is to be limited only by the following claims.

What is claimed is:

1. A vortex induced vibration suppression apparatus comprising;
   a) an elongated one piece body of flexible polymeric material, the body having a wall surrounding a continuous, open ended bore;
   b) the one piece body including a plurality of helical vanes on the body extending along the length thereof each vane tracking a helical path;
   c) a riser pipe that carries the body, the riser pipe occupying the bore;
   d) a slot that extends through the wall; and
   e) wherein the slot does not transversely cut across one or more of the helical paths.

2. The vortex induced vibration suppression apparatus of claim 1 wherein the slot extends along one of the vanes.

3. The vortex induced vibration suppression apparatus of claim 1 wherein there is a removable connection that holds the body together.

4. The vortex induced vibration suppression apparatus of claim 3 wherein the removable connection is comprised of a plurality of spaced apart bolted connections.

5. The vortex induced vibration suppression apparatus of claim 1 wherein the body is of a polyurethane material.

6. The vortex induced vibration suppression apparatus of claim 1 wherein the body is between 50 and 95 Shore A durometer.

7. The vortex induced vibration suppression apparatus of claim 1 wherein the body is between 50 and 75 Shore D durometer.

8. A vortex induced vibration suppression apparatus comprising;
   a) an elongated one piece body of flexible polymeric material, the body having a wall surrounding a continuous, open ended bore;
   b) a plurality of helical vanes on the body extending along the length thereof; and
   c) a riser pipe that carries the body, the riser pipe occupying the bore;
   d) a longitudinal slot that extends through the wall, enabling the body to be separated to afford access to the bore; and
   e) wherein the slot separates one of the vanes into first and second longitudinally extending vane sections.

9. The vortex induced vibration suppression apparatus of claim 8 wherein there is a removable connection that holds the vane sections together at the slot.

10. A vortex induced vibration suppression apparatus comprising;
   a) an elongated body of flexible polymeric material, the body having a wall surrounding a continuous, open ended bore;

b) a plurality of helical vanes on the body extending along the length thereof;
c) a longitudinal slot that extends through the wall, enabling the body to be separated to afford access to the bore; and
d) a spacer that is removably attachable to the body, the spacer including a rounded outer surface that enables the spacer and body to roll and the spacer having a bore shaped to fit the elongated body and its helical vanes.

* * * * *